T. MATHIAS.
Churn-Dashers.
No. 151,234. Patented May 26, 1874.
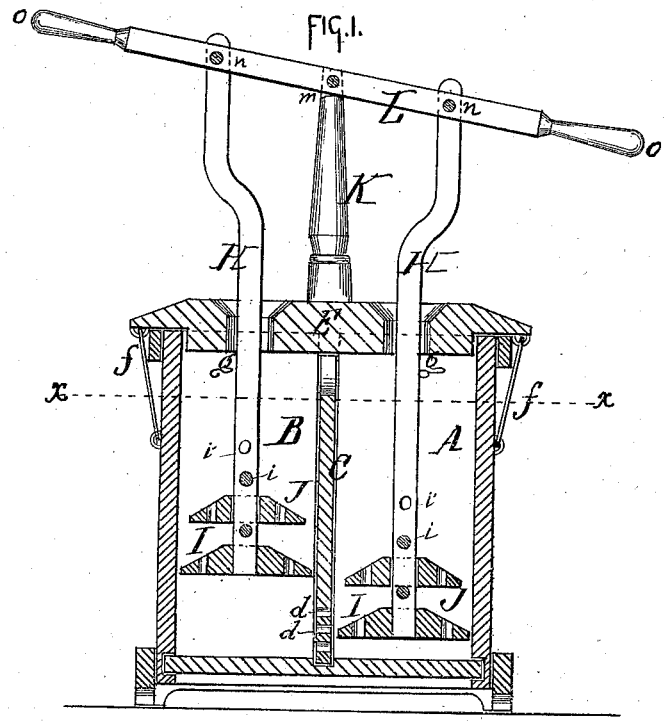
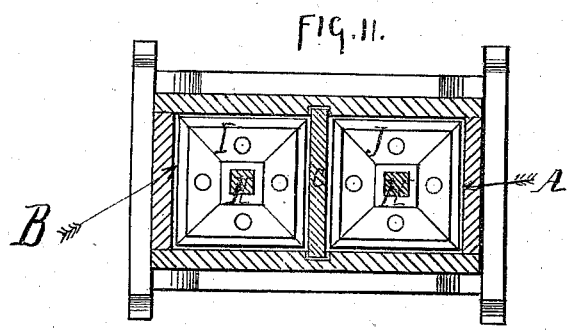
Witnesses: Inventor:
Thomas Mathias
Per Henry Gerner
Atty

UNITED STATES PATENT OFFICE.

THOMAS MATHIAS, OF NEW BERLIN, ILLINOIS, ASSIGNOR OF TWO-THIRDS HIS RIGHT TO LYCURGUS E. AMBROSE AND HENRY GRANDJEAN, OF SAME PLACE.

IMPROVEMENT IN CHURN-DASHERS.

Specification forming part of Letters Patent No. 151,234, dated May 26, 1874; application filed February 9, 1874.

*To all whom it may concern:*

Be it known that I, THOMAS MATHIAS, of New Berlin, county of Sangamon, State of Illinois, have invented certain Improvements in Churns, of which the following is a specification:

The object of my invention is to provide for a double churn having one milk-receiver and operated by one lever and two dash-rods, each dasher-rod having a double dasher on its end. By this arrangement a compact, cheap, and efficient churn is obtained.

My invention consists in constructing a milk or cream receiver in the form of an oblong square, with a vertical partition, pierced with holes, dividing the receiver into two square parts. On the top of this receiver is placed a well-fitting lid, which is fastened with hooks to the sides of the receiver. In the lid, in the center of each square, are cut holes, in which the dasher-rods are placed. These dasher-rods are provided each with a dasher, placed at the lower end, another adjustable dasher being placed on the same rod a few inches higher up. These upper dashers have a vertical play on the dasher-rods, which play is limited by the pins $i\ i$, which are adjustable in the holes $i'\ i'$. The series of holes may be continued as far up the rods as desired, but three being shown for illustration. The tops of the dasher-rods are each pivoted to the same lever, which is, in turn, pivoted in the center to a standard fastened to the center of the lid. This lever is provided with handles at both ends, by which both of the dashers receive a reciprocating motion.

In order to more fully describe my invention I refer to the accompanying drawing forming a part of this specification.

Figure I is a vertical sectional view of a churn embodying my invention. Fig. II is a plan sectional view through line $x\ x$, Fig. I.

A and B represent the two squares of the milk-receiver, divided by the partition C, pierced with holes $d\ d$. E is the lid, with the fastenings $f\ f$ and the holes $g\ g$, in which the dasher-rods H H, with dashers I and J, are placed. K is the standard, to the top of which the lever L is pivoted at $m$. The dasher-rods are pivoted to the same lever at $n\ n$. $o\ o$ are the handles on the end of the lever L.

Having thus described my invention, I desire to claim—

A churn-dasher rod with a fixed dasher at its lower end, and thereabove a second dasher, adjustable upon the rod by means of a series of holes and two movable pins, between which pins the said upper dasher has a vertical play, regulated by the distance apart of the pins, substantially as and for the purpose set forth.

THOMAS MATHIAS.

Witnesses:
   W. M. WARNER,
   JOHN R. GREGORY.